US011372940B2

(12) United States Patent
Ramanath et al.

(10) Patent No.: US 11,372,940 B2
(45) Date of Patent: Jun. 28, 2022

(54) EMBEDDING USER CATEGORIES USING GRAPHS FOR ENHANCING SEARCHES BASED ON SIMILARITIES

(71) Applicant: Microsoft Technology Licensing, LLC, Redmond, WA (US)

(72) Inventors: Rohan Ramanath, Saratoga, CA (US); Irina Belousova, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 634 days.

(21) Appl. No.: 15/613,979

(22) Filed: Jun. 5, 2017

(65) Prior Publication Data

US 2018/0349501 A1 Dec. 6, 2018

(51) Int. Cl.

| | |
|---|---|
| *G06F 16/9535* | (2019.01) |
| *G06N 20/00* | (2019.01) |
| *G06F 16/248* | (2019.01) |
| *G06F 16/28* | (2019.01) |
| *G06F 16/901* | (2019.01) |
| *G06F 16/2457* | (2019.01) |
| *G06Q 10/06* | (2012.01) |
| *G06N 5/02* | (2006.01) |

(52) U.S. Cl.
CPC ........ *G06F 16/9535* (2019.01); *G06F 16/248* (2019.01); *G06F 16/24578* (2019.01); *G06F 16/285* (2019.01); *G06F 16/9024* (2019.01); *G06N 5/022* (2013.01); *G06N 20/00* (2019.01); *G06Q 10/063112* (2013.01)

(58) Field of Classification Search
CPC ............... G06F 16/9535; G06F 16/285; G06F 16/24578; G06F 16/248; G06F 16/9024; G06N 20/00; G06N 5/022; G06Q 10/063112
See application file for complete search history.

(56) References Cited

U.S. PATENT DOCUMENTS

| | | | |
|---|---|---|---|
| 9,576,020 B1* | 2/2017 | Patterson | ............ G06F 16/9024 |
| 9,710,527 B1* | 7/2017 | Sherman | ............... G06F 16/248 |
| 2008/0005072 A1* | 1/2008 | Meek | .................. G06F 16/9535 |
| 2011/0137932 A1* | 6/2011 | Wable | ................. G06F 16/9535 |
| | | | 707/769 |
| 2011/0276376 A1* | 11/2011 | Schmitt | ............. G06Q 30/0207 |
| | | | 705/14.16 |

(Continued)

*Primary Examiner* — Kannan Shanmugasundaram
(74) *Attorney, Agent, or Firm* — Schwegman Lundberg & Woessner, P.A.

(57) ABSTRACT

Methods, systems, and computer programs are presented for embedding user categories into vectors that capture similarities between the user categories. One method includes an operation for building a graph for a category of attributes for users of a social network, the graph including a vertex for each category value. Connections, built between the graph vertices, have a connection value indicating the number of users to which the category values associated with the vertices have been assigned. Further, a first vector for each category value is obtained based on the graph, where a distance between two category values is a function of the connection value between the corresponding vertices. A user vector, based on the first vectors of the category values, is assigned to each user. A search is performed for a given user based on the user vectors, and results are presented to the given user.

14 Claims, 15 Drawing Sheets

(56) References Cited

U.S. PATENT DOCUMENTS

| | | | | |
|---|---|---|---|---|
| 2012/0030286 A1* | 2/2012 | Tiu, Jr. | ............... | G06F 40/134 |
| | | | | 709/204 |
| 2012/0059820 A1* | 3/2012 | Lakshmanan | ....... | G06F 16/9535 |
| | | | | 707/723 |
| 2012/0197835 A1* | 8/2012 | Costa | ............... | G06Q 50/01 |
| | | | | 706/52 |
| 2012/0209832 A1* | 8/2012 | Neystadt | ............. | G06F 16/9535 |
| | | | | 707/723 |
| 2012/0226749 A1* | 9/2012 | Dale | ............... | H04L 63/102 |
| | | | | 709/204 |
| 2013/0095864 A1* | 4/2013 | Marovets | ............... | H04L 51/08 |
| | | | | 455/466 |
| 2013/0317998 A1* | 11/2013 | Chen | ............... | G06Q 10/1053 |
| | | | | 705/321 |
| 2014/0297550 A1* | 10/2014 | Miller | ............... | G06Q 50/01 |
| | | | | 705/321 |
| 2015/0127565 A1* | 5/2015 | Chevalier | ............. | G06Q 10/00 |
| | | | | 705/319 |
| 2015/0331879 A1* | 11/2015 | Jain | ............... | G06F 16/00 |
| | | | | 707/750 |
| 2016/0350834 A1* | 12/2016 | Wilson | ............... | G06N 3/084 |
| 2017/0103402 A1* | 4/2017 | El-Diraby | ............. | G06Q 50/01 |
| 2018/0121550 A1* | 5/2018 | Jeon | ............... | G06Q 50/01 |

\* cited by examiner

EMBEDDING USER CATEGORIES USING GRAPHS FOR ENHANCING SEARCHES BASED ON SIMILARITIES

TECHNICAL FIELD

The subject matter disclosed herein generally relates to methods, systems, and programs for analyzing user data and, more particularly, methods, systems, and computer programs for embedding user data into vectors for improved searching.

BACKGROUND

Some personalized searches involve analyzing the user characteristics against a corpus of possible results to find the best options for the user. For example, a job search may generate different results for different users depending on their background, education, experience, etc. Sometimes, finding similarities between users is helpful because if a user has shown interest in a job, a user with similar characteristics will probably be interested in that job too. This way, the system learns from user interactions.

However, the number of users in a social network may be in the millions, and the categories of data (e.g., educational institutions) may also be into the thousands or millions. Finding similarities among all these users may be an expensive proposition given the large amount of data and possible categories. In addition, multiple categories may be used at the same time (e.g., skills, title, and education), which further compounds the complexity of the problem.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
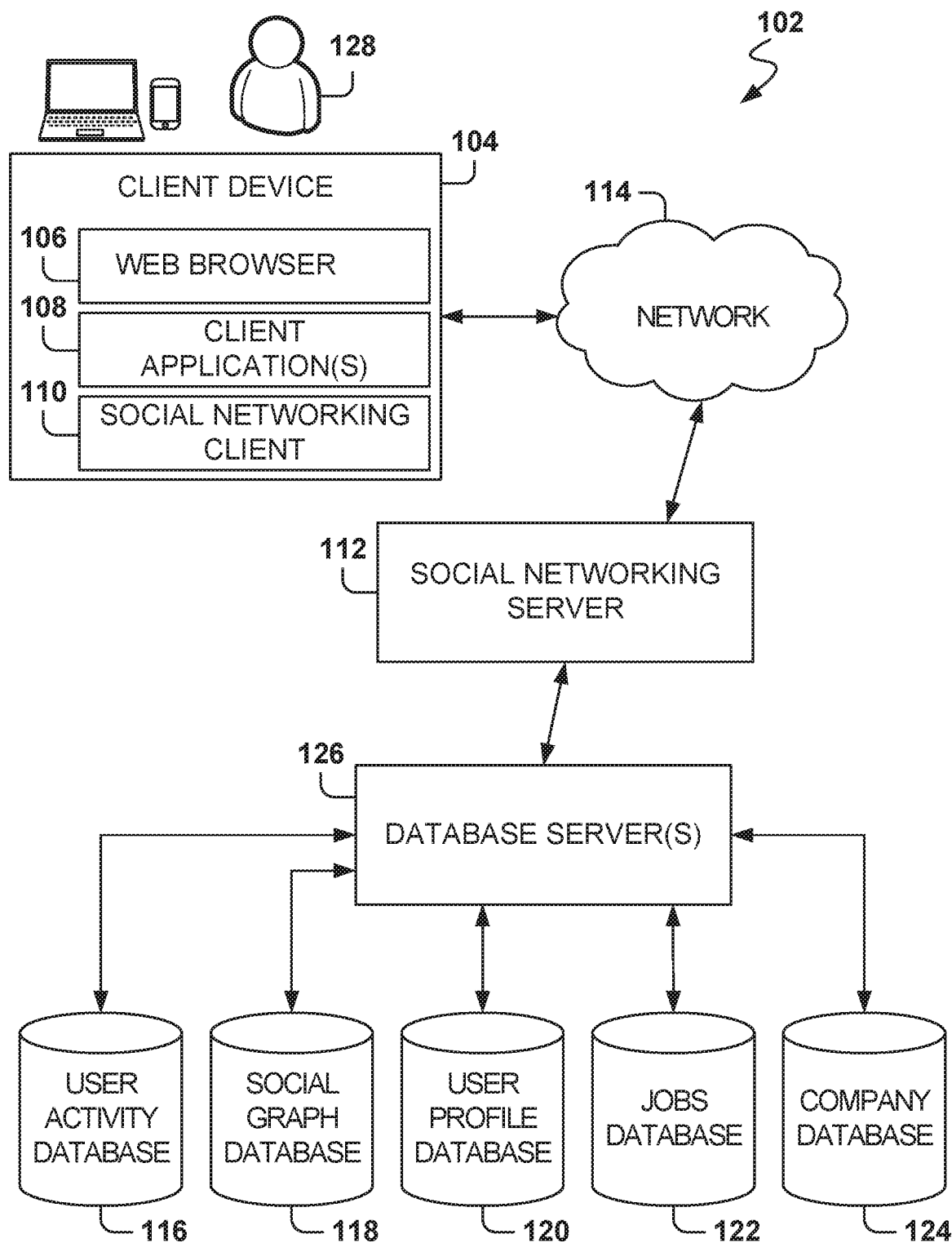
FIG. 1 is a block diagram illustrating a networked system, according to some example embodiments, including a social networking server.

Example methods, systems, and computer programs are directed to embedding user categories into vectors that capture the similarities between the user categories. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Categorical features are those features that may have a value from a finite set of possible values. In some example embodiments, categorical features include skills of the user, title of the user, industry of the user, company of the user, and educational institutions attended by the user. In some cases, the user may have multiple values of a category assigned, such as when the user identifies multiple skills within the user profile.

Many relevance problems aim at identifying, predicting, or searching something for the user, such as finding a social connection on a social network, finding a job, or finding an advertisement that would interest the user. In some example embodiments, relevance helps identify the things that are appropriate for the user based on the user features and one or more types of similarities. For example, a job search engine may find jobs that would be interesting for the user because "similar" users have explored those jobs.

However, finding similarities among users, among users and jobs, users and advertisements, etc., are complex problems, especially in a system where there could be millions of users, jobs, and advertisements. In some examples, similarities may be identified by converting categorical values to vectors (a process referred to herein as "embedding") and then utilizing tools well-suited for operating on vectors. However, a simple vector definition where each value of the category is assigned a position within the vector (a representation sometimes called "bag of words") results in very large vectors with very sparse values (e.g., a single 1 among 35,000 values). These vectors are difficult to work with, so reducing the size of the vectors is important.

In addition, obtaining vectors with an embedded semantic meaning is important because similarity analysis is simplified using the embedded semantic meaning. For example, two vectors being close to each other indicates that the two vectors represent two categorical values that are similar.

Embodiments presented herein describe methods for representing categorical values in vectors of small size that capture similarity with a high level of accuracy. In some example embodiments, a graph is constructed based on relationships found between the categorical values. For example, the graph may include a connection (and a respective counter) between two categorical values when a user of the social network is associated with both categorical values. For example, a graph for skills may be defined where the connections between two vertices on the graph include a counter indicating how many users of the social network have both skills identified in their profiles. It is noted that embodiments are presented with reference to parameters associated with the user for some search applications, but the principles presented for finding similarities may be applied to other applications and other parameters.

After the graph is constructed, the graph is used to create vectors that reflect values within the graph, such as the strength between connections or the number of shared neighbors. The vectors provide a good representation of the similarities between each of the categorical values.

The benefits of using this type of embedding include vectors that reflect entity similarity (e.g., skills, titles, companies), distances between vector entities in the vector space that reflect the distance in semantic meaning, vectors that have low dimensionality (e.g., a dimension between 15 and 25), elimination of the sparsity problem, and the vectors may be utilized in an unsupervised manner.

One general aspect includes a method having an operation for building, by one or more processors, a graph associated with a first category of attributes for users of a social network. The graph includes a vertex for each first category value. The method further includes building, by the one or more processors, connections between the vertices in the graph, each connection having a connection value indicating a number of users of the social network having assigned the first category values associated with the vertices of the connection. The method also includes obtaining, by the one or more processors, a first vector for each first category value based on the graph, where a distance between two first category values is a function of the connection value between the corresponding vertices. The method further includes assigning, by the one or more processors, a user vector to the users of the social network, the user vector for each user being based on the first vectors of the first category values assigned to the user. The method further includes operations for performing, by the one or more processors, a search for a first user based on the user vectors of the users of the social network, and causing presentation of results of the search to the first user.

One general aspect includes a system including: a memory including instructions and one or more computer processors. The instructions, when executed by the one or more computer processors, cause the one or more computer processors to perform operations including: building a graph associated with a first category of attributes for users of a social network, the graph including a vertex for each first category value; building connections between the vertices in the graph, each connection having a connection value indicating a number of users of the social network having assigned the first category values associated with the vertices of the connection; obtaining a first vector for each first category value based on the graph, where a distance between two first category values is a function of the connection value between the corresponding vertices; assigning a user vector to the users of the social network, the user vector for each user being based on the first vectors of the first category values assigned to the user; performing a search for a first user based on the user vectors of the users of the social network; and causing presentation of results of the search to the first user.

One general aspect includes a non-transitory machine-readable storage medium including instructions that, when executed by a machine, cause the machine to perform operations including: building a graph associated with a first category of attributes for users of a social network, the graph including a vertex for each first category value; building connections between the vertices in the graph, each connection having a connection value indicating a number of users of the social network having assigned the first category values associated with the vertices of the connection; obtaining a first vector for each first category value based on the graph, where a distance between two first category values is a function of the connection value between the corresponding vertices; assigning a user vector to the users of the social network, the user vector for each user being based on the first vectors of the first category values assigned to the user; performing a search for a first user based on the user vectors of the users of the social network; and causing presentation of results of the search to the first user.

FIG. 1 is a block diagram illustrating a networked system, according to some example embodiments, including a social networking server. A social networking server 112 provides server-side functionality via a network 114 (e.g., the Internet) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a tablet, a multi-processor system, a microprocessor-based or programmable consumer electronic system, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 128 may be a person, a machine, or other means of interacting with the client device 104.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a user profile, to authenticate a user 128, to identify or locate other connected users, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a user activity database 116, a social graph database 118, a user profile database 120, a jobs database 122, and a company database 124. The databases 116-124 may be implemented as one or more types of databases including, but not limited to, a hierarchical database, a relational database, an object-oriented database, one or more flat files, or combinations thereof.

The user profile database 120 stores user profile information about users who have registered with the social networking server 112. With regard to the user profile database 120, the user may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information is stored, for example, in the user profile database 120. Similarly, when a representative of an organization initially registers the organization with the social networking service provided by the social networking server 112, the representative may be prompted to provide certain information about the organization, such as the company industry. This information may be stored, for example, in the user profile database 120. In some embodiments, the profile data may be processed (e.g., in the background or offline) to generate various derived profile data. For example, if a user has provided information about various job titles that the user has held with the same company or different companies, and for how long, this information may be used to infer or derive a user profile attribute indicating the user's overall seniority level, or seniority level within a particular company. In some example embodiments, importing or otherwise accessing data from one or more externally hosted data sources may enhance profile data for both users and organizations. For instance, with companies in particular, financial data may be imported from one or more external data sources, and made part of a company's profile.

In some example embodiments, a company database 124 stores information regarding companies in the user's profile. A company may also be a member, but some companies may not be members of the social network although some of the employees of the company may be members of the social network. The company database 124 includes company information such as name, industry, contact information, website, address, location, geographic scope, and the like.

As users interact with the social networking service provided by the social networking server 112, the social networking server 112 is configured to monitor these interactions. Examples of interactions include, but are not limited to, commenting on posts entered by other users, viewing user profiles, editing or viewing a user's own profile, sharing content outside of the social networking service (e.g., an article provided by an entity other than the social networking server 112), updating a current status, posting content for other users to view and comment on, job suggestions for the users, job-post searches, and other such interactions. In one embodiment, records of these interactions are stored in the user activity database 116, which associates interactions made by a user with his or her user profile stored in the user profile database 120. In one example embodiment, the user activity database 116 includes the posts created by the users of the social networking service for presentation on user feeds.

The jobs database 122 includes job postings offered by companies in the company database 124. Each job posting includes job-related information such as any combination of employer, job title, job description, requirements for the job, salary and benefits, geographic location, one or more job skills required, the day the job was posted, relocation benefits, and the like.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124.

While the database server(s) 126 is illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 116-124, or combinations thereof. Accordingly, and in one embodiment, the database server(s) 126 implemented by the social networking service are further configured to communicate with the social networking server 112.

Figure 2:
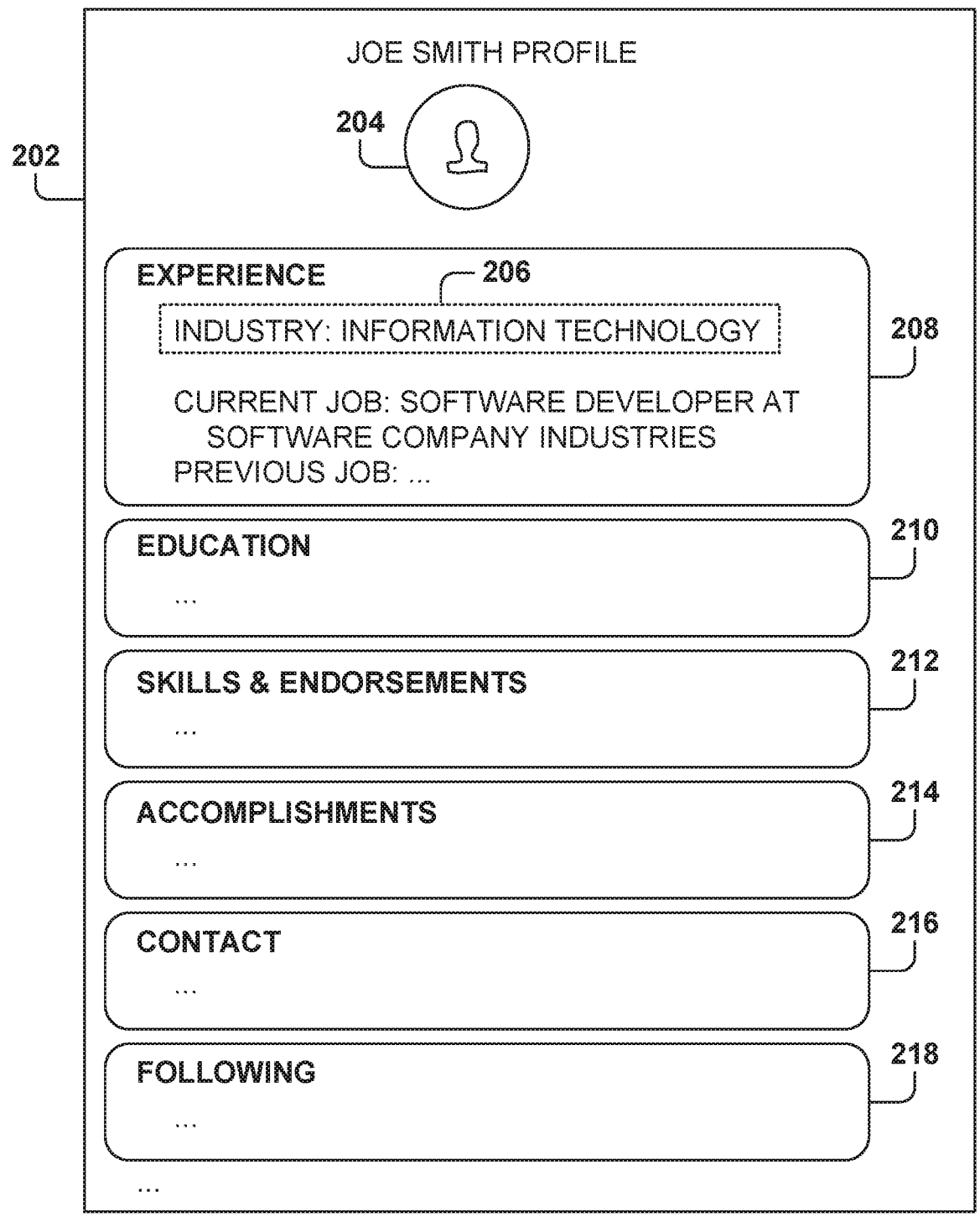
FIG. 2 is a screenshot of a user's profile view, according to some example embodiments.

FIG. 2 is a screenshot of a user's profile view, according to some example embodiments. Each user in the social network has a user profile 202, which includes information about the user. The user profile 202 is configurable by the user (e.g., the user 128) and also includes information based on the user activity in the social network (e.g., likes, posts read).

In one example embodiment, the user profile 202 may include information in several categories, such as experience 208, education 210, skills and endorsements 212, accomplishments 214, contact information 216, following 218, and the like. Skills include professional competences that the user has, and the skills may be added by the user or by other users of the social network. Example skills include C++, Java, Object Programming, Data Mining, Machine Learning, Data Scientist, and the like. Other users of the social network may endorse one or more of the skills and, in some example embodiments, the account is associated with the number of endorsements received for each skill from other users.

The experience 208 category of information includes information related to the professional experience of the user. In one example embodiment, the experience 208 information includes an industry 206, which identifies the industry in which the user works. Some examples of industries configurable in the user profile 202 include information technology, mechanical engineering, marketing, and the like. The user profile 202 is identified as associated with a particular industry 206, and the posts related to that particular industry 206 are considered for inclusion in the user's feed, even if the posts do not originate from the user's connections or from other types of entities that the user explicitly follows. The experience 208 information area may also include information about the current job and previous jobs held by the user.

The education 210 category includes information about the educational background of the user. The skills and endorsements 212 category includes information about professional skills that the user has identified as having been acquired by the user, and endorsements entered by other users of the social network supporting the skills of the user. The accomplishments 214 area includes accomplishments entered by the user, and the contact information 216 includes contact information for the user, such as email and phone number. The following 218 area includes the name of entities in the social network being followed by the user.

In some implementations, to provide job recommendations, a job search engine looks for matches in the title or the skills of the user. The problem with this approach is that there may be jobs associated with different titles, although the different titles may be similar to the user's title. For example, the title "software engineer" is different from the title "application developer," but both titles are closely related because a majority of software engineers are also application developers, and vice versa. This title similarity is not captured by the job search, so many results may be missed that could be of interest to the user. Embodiments presented herein use similarity analysis to identify categorical values that are closely related in order to improve searching, such as job searches, job recommendations, connections recommendations, profile-update recommendations, etc.

Figure 3:
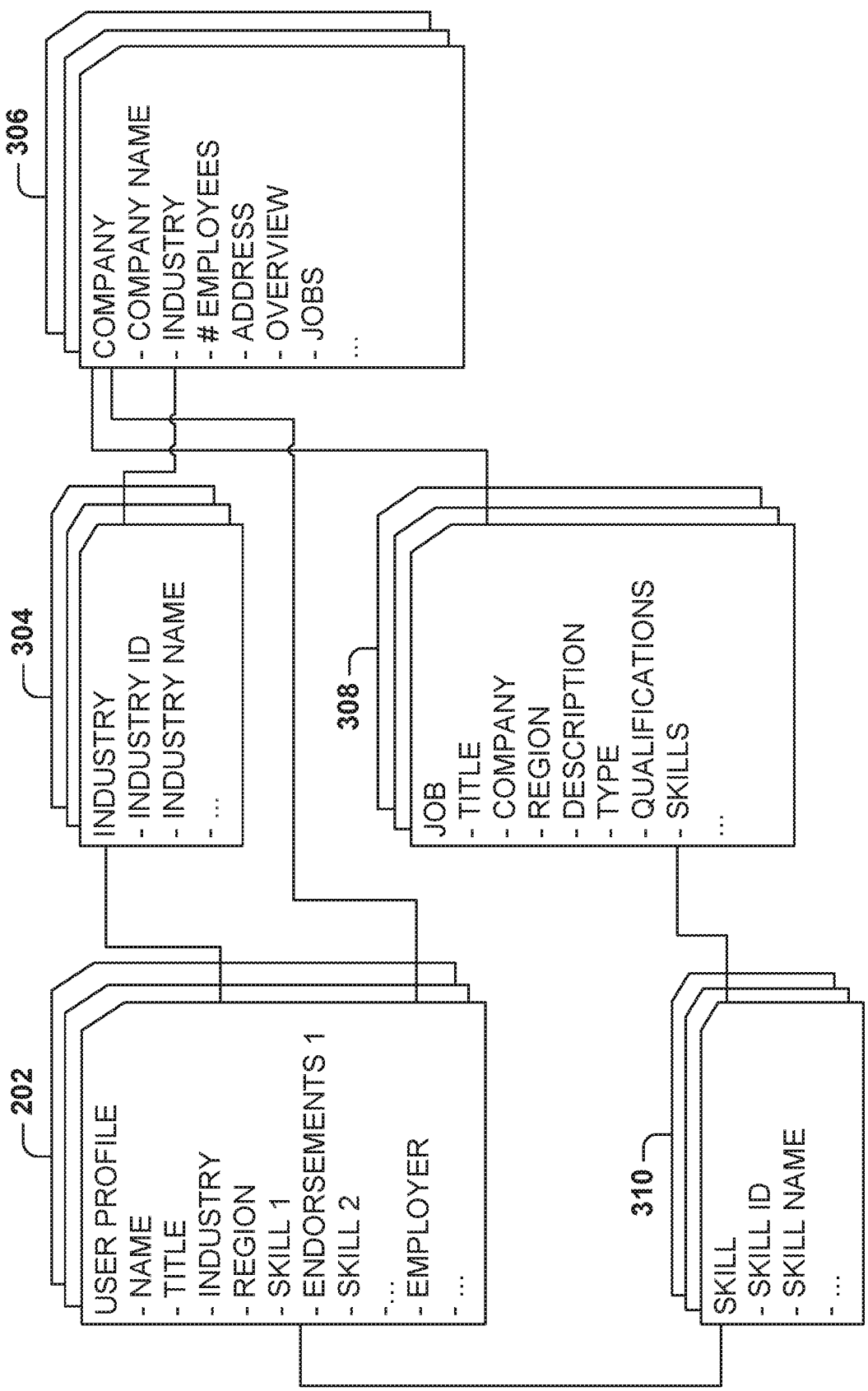
FIG. 3 illustrates data structures for storing job and user information, according to some example embodiments.

FIG. 3 illustrates data structures for storing job and user information, according to some example embodiments. The user profile 202, as discussed above, includes user information, such as name, title (e.g., job title), industry (e.g., legal services), geographic region, employer, skills and endorsements, and so forth. In some example embodiments, the user profile 202 also includes job-related data, such as jobs previously applied to, or jobs already suggested to the user (and how many times the job has been suggested to the user). Within the user profile 202, the skill information is linked to skill data 310, the employer information is linked to company data 306, and the industry information is linked to industry data 304.

The industry data 304 is a table for storing the industries identified in the social network. In one example embodiment, the industry data 304 includes an industry identifier (e.g., a numerical value or a text string), and an industry name, which is a text string associated with the industry (e.g., legal services).

In one example embodiment, the company data 306 includes company information, such as company name, industry associated with the company, number of employees, address, overview description of the company, job postings, and the like. In some example embodiments, the industry is linked to the industry data 304.

The skill data 310 is a table for storing the different skills identified in the social network. In one example embodiment, the skill data 310 includes a skill identifier (ID) (e.g., a numerical value or a text string) and a name for the skill. The skill identifier may be linked to the user profiles 202 and job data 308.

In one example embodiment, job data 308 includes data for jobs posted by companies in the social network. The job data 308 includes one or more of a title associated with the job (e.g., software developer), a company that posted the job, a geographic region for the job, a description of the job, a type of job, qualifications required for the job, and one or more skills. The job data 308 may be linked to the company data 306 and the skill data 310.

It is noted that the embodiments illustrated in FIG. 3 are examples and do not describe every possible embodiment. Other embodiments may utilize different data structures, fewer data structures, combine the information from two data structures into one, add additional or fewer links among the data structures, and the like. The embodiments illustrated in FIG. 3 should therefore not be interpreted to be exclusive or limiting, but rather illustrative.

Figure 4:
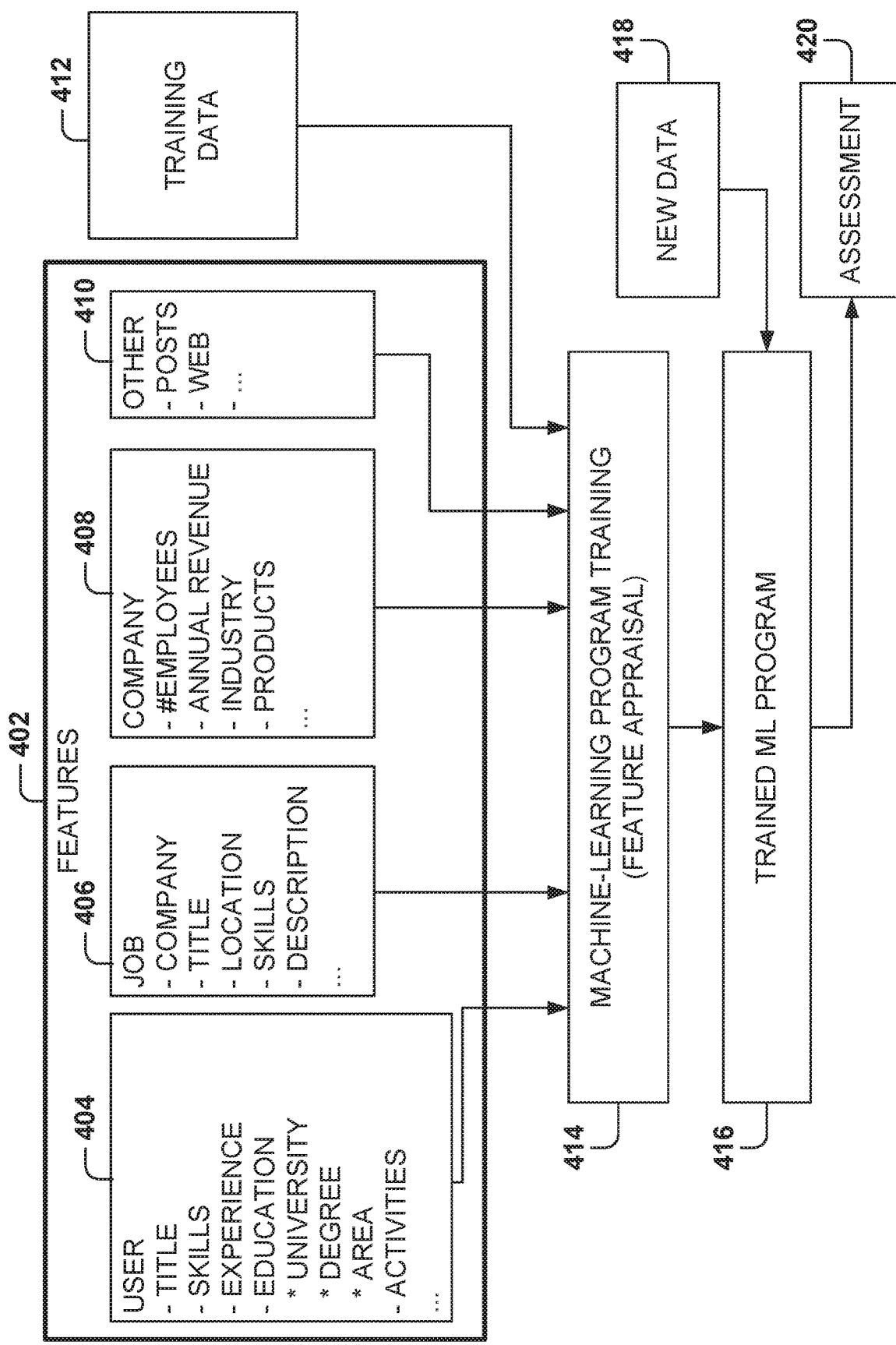
FIG. 4 illustrates the training and use of a machine-learning program, according to some example embodiments.

FIG. 4 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 412 in order to make data-driven predictions or decisions expressed as outputs or assessments 420. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a job affinity score (e.g., a number from 1 to 100) to qualify each job as a match for the user (e.g., calculating the job affinity score). The machine-learning algorithms utilize the training data 412 to find correlations among identified features 402 that affect the outcome.

The machine-learning algorithms utilize features for analyzing the data to generate assessments 420. A feature 402 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 402 may be of different types and may include one or more of user features 404, job features 406, company features 408, and other features 410. The user features 404 may include one or more of the data in the user profile 202, as described in FIG. 3, such as title, skills and endorsements 212, experience 208, education 210, and the like. The job features 406 may include any data related to the job, and the company features 408 may include any data related to the company. In some example embodiments, other features 410 may be included, such as post data, message data, web data, and the like.

The machine-learning algorithms utilize the training data 412 to find correlations among the identified features 402 that affect the outcome or assessment 420. In some example embodiments, the training data 412 includes known data for one or more identified features 402 and one or more outcomes, such as jobs searched by users, job suggestions selected for reviews, users changing companies, users adding social connections, users' activities online, etc.

With the training data 412 and the identified features 402, the machine-learning tool is trained at operation 414. The machine-learning tool appraises the value of the features 402 as they correlate to the training data 412. The result of the training is the trained machine-learning program 416.

When the machine-learning program 416 is used to perform an assessment, new data 418 is provided as an input to the trained machine-learning program 416, and the machine-learning program 416 generates the assessment 420 as output. For example, when a user performs a job search, a machine-learning program, trained with social network data, utilizes the user data and the job data, from the jobs in the database, to search for jobs that match the user's profile and activity.

Figure 5:
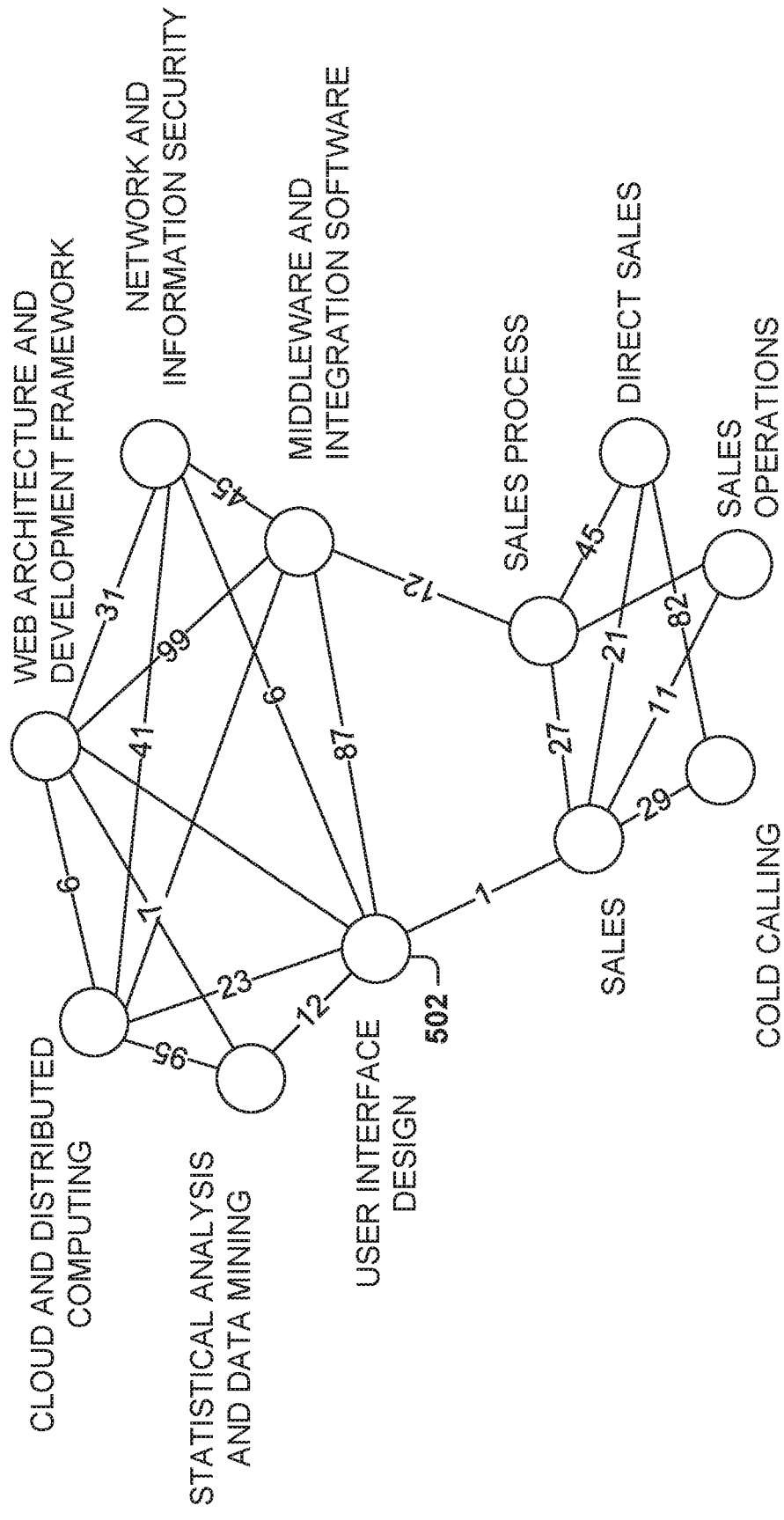
FIG. 5 is a graph based on user shared skills, according to some example embodiments.

FIG. 5 is a graph based on user shared skills, according to some example embodiments. Social networks may have a large amount of professional information about users. Much of the data may be categorical, such as skills, companies, educational institutions, etc. In order to use this data in a machine-learning algorithm as a feature, the data has to be encoded.

One simple approach to encoding, referred to as "bag of words" or "one-hot encoding," is to identify one position in a vector for each of the possible values within a category, and then when a user has that value, the corresponding position is encoded as a 1 and the remainder of the positions are encoded as a 0. This means that if there are 35,000 skills, the dimension of the vector is 35,000, where the majority of the values are zeros, e.g., the data is very sparse.

The problem with one-hot encoding is that the large vectors are hard to use. Further, there is no similarity information ingrained within the vectors as all the skills are equally different from each other. It is also expensive to store the large vectors and computationally expensive to operate with these large vectors, e.g., to calculate the distance between two vectors.

Embodiments presented hearing provide methods for constructing data embeddings that may be used for different applications, such as to improve searches customized for the user. Embedding is a way to represent data as vectors in a space. Examples of embeddings algorithms include Principal Component Analysis (PCA), Singular Value Decomposition (SVD), matrix factorization, and Large-scale Information Network Embedding (LINE). Embodiments are described herein with reference to LINE, but other embedding algorithms may be utilized.

One approach to embedding is to use the tool Word2vec, where the goal is to learn embedding for a word in such a way that prediction of the next word or context words is improved. For example, user profile skills may be used as plain text and then Word2vec may be used to learn embeddings. The downside of this approach is that, in Word2vec, there is an assumption that there is an order to the input (e.g., words in a sentence), while in reality there is no order associated with many categories (e.g., skills in the user profile).

To overcome the positionality issue, network embedding methods are used to construct embeddings, and in order to use network embedding methods, a graph is constructed. Embodiments presented herein are described with reference to bidirectional graphs, but other graphs may be constructed utilizing directionality between the vertices of the graph, depending on the application. For example, if a program's objective is to identify transitions between companies, where an employee moves from one company to another, a directed graph may be constructed in order to analyze transitions.

The graph illustrated in FIG. 5 is a graph based on user shared skills. Each vertex 502 of the graph, also referred to herein as a node, represents a skill; a connection between two skills is added if the two skills appear together in the profile of a user. A connection value, also referred to as a connection weight, is assigned to the connection between two vertices, where the connection value represents the number of users in the social network that have both skills. If many users of the social network have the same pair of skills, this means that this pair of skills is closely related, and the two corresponding skills have a high degree of similarity.

It is noted that the embodiments illustrated are examples and the vertices and connection values are for illustration purposes. The embodiments illustrated in FIG. 5 should therefore not be interpreted to be exclusive or limiting, but rather illustrative. Further, other graphs may be built based on other user categories, such as titles, companies, and educational institutions.

Other types of graphs may also be constructed for other categories. For example, a company graph may be built using first-degree connections information. The vertices of the companies graph represent companies, and a connection between two companies is created if there is a first-degree connection between users working in those two companies. For example, user John works at company A, user Alice works at company B, and John is connected to Alice in the social network. The companies graph would include a node for company A, a node for company B, and a connection between nodes A and B, initially with a connection value of 1 for the connection between Alice and John. The connection values between nodes represent the number of first-degree connections between the employees of the two companies.

Figure 6:
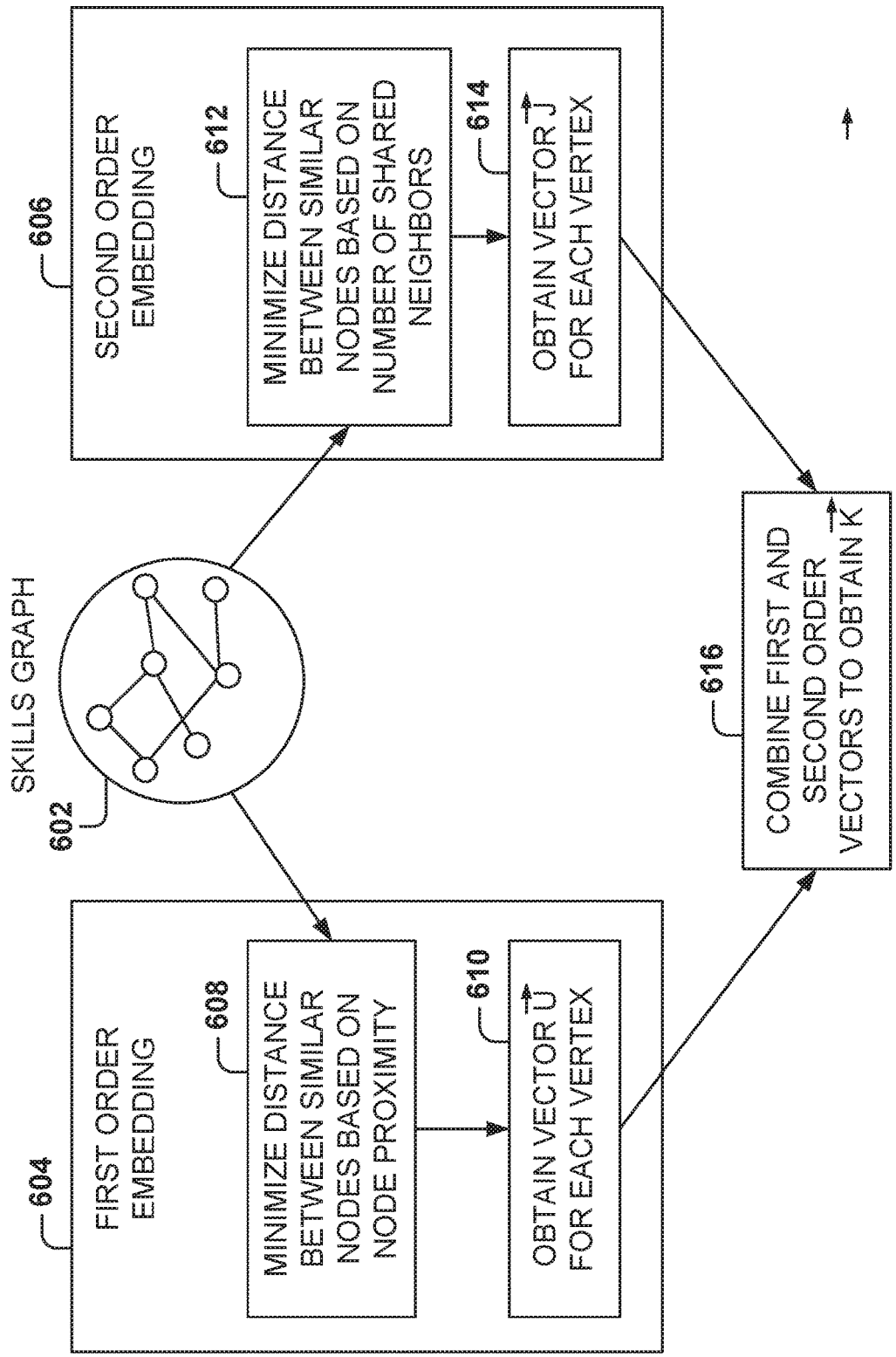
FIG. 6 illustrates the embedding of skills into vectors, according to some example embodiments.

FIG. 6 illustrates the embedding of skills into vectors, according to some example embodiments. After the skills graph 602 is constructed, the embedding of the categorical feature takes place. Embedding refers to the mapping of the categorical feature values onto a dense vector representation.

There are several embeddings algorithms, such as Principal Component Analysis (PCA), Singular Value Decomposition (SVD), matrix factorization, and Large-scale Information Network Embedding (LINE). Embodiments are described herein with reference to LINE, but any other embedding algorithm may be utilized. LINE is suitable for arbitrary types of information networks: undirected, directed, and/or weighted. LINE optimizes a designed objective function that preserves both the local and global network structures, and preserves both the first-order and second-order proximities.

In some example embodiments, two types of embeddings are utilized: first order embeddings 604 and second-order embeddings 606. First order embedding 604 is based on the proximity between the vertices of the graph 602, where the proximity is defined by the connection value, as described above with reference to FIG. 5. Therefore, nodes with strong connections will result in vectors that are closer to each other than nodes with weak connections.

Second-order embeddings 606 are based on the assumption that vertices sharing a large number of connections to other vertices are similar to each other. In other words, two vertices that have many shared neighbors will have vectors proximate to each other when using second-order embeddings 606.

With reference to first-order embeddings 604, a goal is to minimize the distance between similar nodes based on their proximity (operation 608) to obtain a vector $\vec{u}_i$ for each vertex $V_i$, where $\vec{u}_i$ is a low-dimensional vector (operation 610). Vertices $V_i$ and $V_j$ are connected by an undirected edge (i, j). The joint probability $p_1(V_i, V_j)$ between vertices $V_i$ and $V_j$ is defined as follows:

$$p_1(V_i, V_j) = \frac{1}{1 + \exp(-\vec{u}_i^T \cdot \vec{u}_j)} \quad (1)$$

Equation (1) defines a distribution $p(\cdot,\cdot)$ over the space $V \times V$ of vertices, and its empirical probability $\hat{p}(i,j)$ is defined as follows:

$$\hat{p}(i, j) = \frac{w_{ij}}{W},$$

where $W = \Sigma_{(i,j) \in E} w_{ij}$

To preserve the first-order proximity, the following objective function is minimized:

$$O_1 = d(\hat{p}_1(\cdot,\cdot), p_1(\cdot,\cdot))$$

The result is the first proximity vectors $\vec{u}_i$ for the existing vertices.

For the second-order embedding 606, the distance between similar nodes is minimized (operation 612) based on the number of shared neighbors, where vertices with common neighbors will have vectors closer than vertices without common neighbors. The result is a vector $\vec{j}_i$ for the existing vertices (operation 614). More details may be found in "LINE: Large-scale Information Network Embedding," Jian Tang et al., Proceedings of the 24th International Conference on World Wide Web, Pages 1067-1077.

In some example embodiments, the first- and second-order embeddings may be combined (operation 616) to create a combined vector $\vec{k}_i$. In some example embodiments, the first-order and second-order proximity vectors are calculated separately and then concatenated for each vector. In other example embodiments, the combined vector may be calculated by calculating the cosine similarity using the first-order embeddings as one feature and a cosine similarity using the second-order embeddings as another feature. In other embodiments, other combinations are possible, such as calculating the elementwise maximum of the vectors, or the elementwise average, etc.

Some solutions define a graph based on user connections, which is referred to as a user graph. The problem with the user graph is that it is not possible to do direct embeddings from the user graph for features like skills, companies, and titles. Additionally, the user graph could have 300 million vertices for 300 million users, which makes operations on the graph extremely expensive in terms of computing resources.

By relying on categorical features graphs instead of on the user graph, it is possible to learn about any of the categorical features and create the embeddings that reflect the similarities between the different feature values. Further, even though a user may not have a feature value in the user's profile (e.g., data science skill), it is still possible to learn about that user if the user has related skills (e.g., machine learning), by using similarities and the embeddings described above.

By using graphs, it is possible to greatly reduce the dimensionality of the embeddings. For example, if there are 35000 possible skills, the dimension of the skill vector may be reduced to 15, or a value in the range between 10 and 50, although other dimensionalities are also possible.

Another benefit is that each graph for the different categorical features may be learned independently from the others. Even the second-order graphs, as described below with reference to FIG. 7, maybe calculated separately.

Some solutions for embedding are based on the tool Word2vec, which is a tool designed for text analysis. The problem with Word2vec is that it considers the order of values, e.g., considers the order of words in a sentence. However, if a user has two skills, it doesn't matter in which order the skills are input or stored.

Further, Word2vec works well with dimensions between 100 and 300, while the embodiments presented herein generate vectors with dimensions such as 15, resulting in data storage that is about one tenth or one twentieth of the storage required by Word2vec. Further, handling the smaller vectors also results in significant savings in computing resources for generating searches. Further, network embeddings described herein work better than Word2vec because the graph structure is captured, while Word2vec is focused on text sequence.

Figure 7:
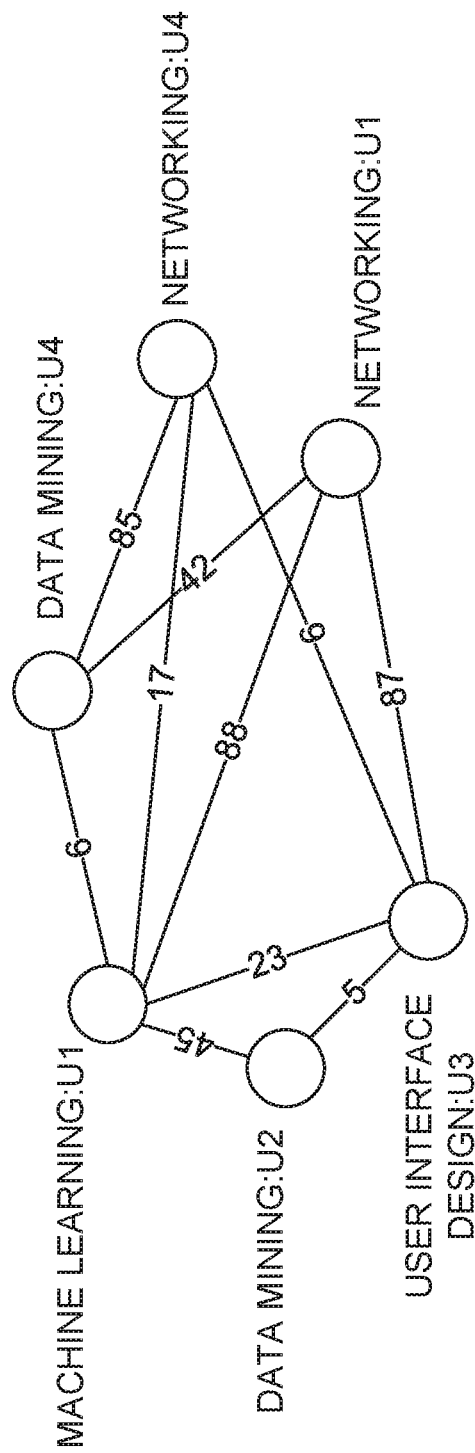
FIG. 7 is a graph based on two categorical features, according to some example embodiments.

FIG. 7 is a graph based on two categorical features, according to some example embodiments. The graph of FIG. 5 is a graph referred to as a first-order graph because it captures relationships for one feature. It is also possible to learn from combinations of two features, as shown in the example of FIG. 7. These graphs are referred to as second-order graphs because they combine the values for two categories. Further, it is also possible to calculate graphs of third, fourth, etc., dimensions to combine multiple categories.

By creating second-order graphs, it is possible to learn about the relationships between two categories. In the example of FIG. 7, two categories are considered: skills and educational institution, also referred to simply as universities, although other types of educational institutions are also possible. The second-order graph may learn about the relationships between skills and universities, such as, for example, which universities are most likely to produce data scientists, artists, actors, engineers, etc.

In the second-order graph, each vertex is a combination of a value from the first category and a value from the second category, which in FIG. 7 is represented as the two values separated by a colon, e.g., $F_1:F_2$, where $F_1$ is the value of the first feature and $F_2$ is the value of the second feature. A vertex is created when a user has both $F_1$ and $F_2$ in the user's profile. For example, one or more users have the "machine learning" skill and attended university U1. The connection value is the number of users that have the values corresponding to the two vertices. Of course, users may have more than one skill and may have attended more than one university.

In the example of FIG. 7, there are 85 connections between data mining:U4 and networking:U4, which means that a relatively large number of users attended U4 university and acquired skills of "Data mining" and "Networking."

Another valuable second-order graph may be constructed for the combination of company and title seniority. It is known that titles may differ very much from one industry to another or even from one company to another. For example, a large high-tech company may have few vice presidents, while a small bank may have a large number of employees with the title vice president. Further, a technology company may have a different seniority level than another technology company for the titles "member of the technical staff" or "software engineer." Therefore, combining company and seniority is a valuable tool to learn about the different meanings of title in the different companies and also within different industries.

After the second-order graph is constructed, the embedding is performed to generate the respective vectors. These vectors may be used, together with other types of vectors, by the machine learning algorithms to improve searching or other information-related activities.

Figure 8:
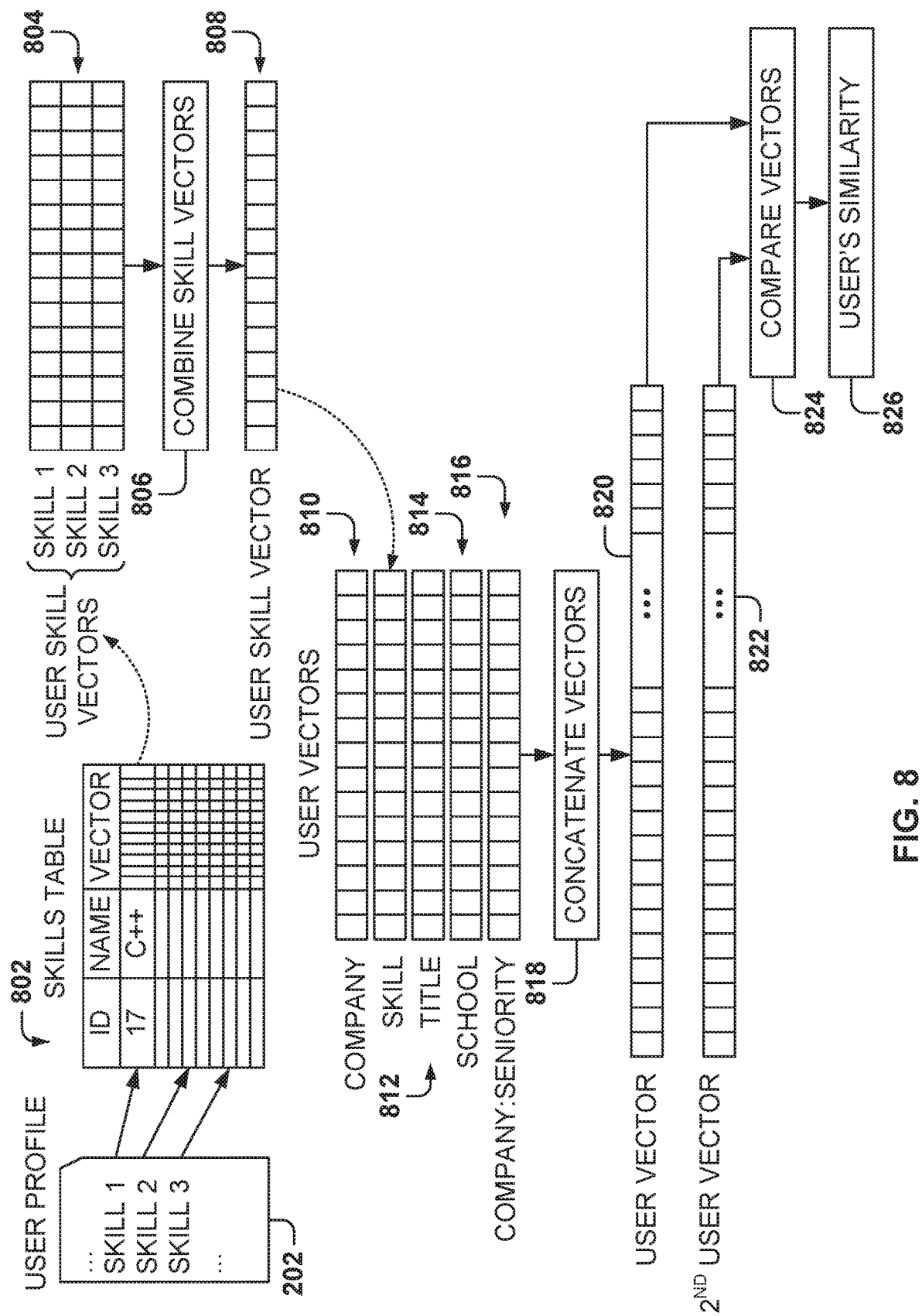
FIG. 8 illustrates a method for identifying similarities among user skills, according to some example embodiments.

FIG. 8 illustrates a method for identifying similarities among user skills, according to some example embodiments. Once the categorical vectors are obtained, the vectors may be combined depending on the application. As used herein, the examples are described with reference to customized searches personalized for the user, but the same principles may be utilized for other applications based on user data and activity data. For example, the search may be for jobs, social connections, salary information, regional distribution of people or employees, etc.

The example of FIG. 8 illustrates finding the similarity between two users based on five categories: company, skills, title, school (e.g., university), and combination of company and seniority. These similarities may be used for customizing searches, such as searching for a job. A use case for enhancing a job search query using similarities is presented below with reference to FIG. 10, and another use case for searching jobs is presented below with reference to FIG. 11.

Based on the user profile 202, the skills are identified for a user. A skills table 802 maps each skill to an identifier (e.g., 17), the name of the skill (e.g., C++), and the skill vector. In one example, the user has three skills, with the three corresponding vectors 804. At operation 806, the skill vectors are combined into one user skill vector 808.

There are several ways in which the skill vectors may be combined. In one example embodiment, the vectors are combined by calculating the elementwise maximum for each value. For example, the first element of the user skill vector is the maximum of the first element in each of the three skill vectors. In other example embodiments, other operations may be performed, such as elementwise average, or elementwise minimum, etc. In other example embodiments, the skill vectors may be concatenated together. However, this approach results in a user skill vector of different sizes because users may have a different number of skills.

By using the elementwise maximum operation, the user skill vector 808 for all the users has the same dimension. For description purposes, the skill vectors in this example have a dimension of 25. One of the benefits of using the maximum is that applying the maximum is effective in reducing noise. For example, if there is a company with two employees and one employee came from one university and the other one from another university, the information is not very helpful, and may be confusing, to the search algorithm. By taking the maximum, the noise is reduced. Further, practice has shown that using the maximum is effective for working with vector embeddings. Some applications may produce better results using the minimum, and the data analyst may decide to use the minimum for these applications. Similarly, the elementwise average may be used and has been found effective for some types of applications.

Similarly, the user company vector 810 is calculated by combining company vectors if the user has several companies, or by using the company vector of a company when the user has only one company in the profile. Further, the user title vector 812, the user school vector 814, and the user company:seniority vector 816 are calculated.

The user vectors are then combined to generate a user vector 820. In some example embodiments, the user vector 820 is generated by concatenating 818 the user vectors 808, 810, 812, 814, and 816. One benefit of using fix-sized vectors is that the user vector 820 has the same dimension for all users, in this case a dimension of 125 (25×5).

The user vector 820 may then be used, for example, to calculate the similarity with a second user having the user vector 822. In some example embodiments, the similarity may be calculated by comparing the vectors in an operation 824, such as by calculating the cosine similarity to obtain a user-similarity score 826.

In some example embodiments, the user vector is used as a feature for an MLP program used to perform a search, such as a job search. The MLP uses the vectors to compare user profiles and find similarities. For example, if a user has shown interest in a particular job, a user with a similar user vector will probably be interested in the same job. These are the types of relationships that the MLP evaluates during training based on the vector data and other data, as described above with reference to FIG. 4.

In other example embodiments, the user vector 820 may be compared against a job vector, which is a vector built based on the characteristics of a job. Determining if the job is a good match for the user may be performed by comparing the user vector to the job vector, or by using the job vector and the user vector as features by the MLP that calculates a job score for the job, where the job score reflects the degree of matching between the user and the job.

It is noted that the user vectors 808, 810, 812, 814, and 816 illustrated in FIG. 8 are examples and do not describe every possible embodiment. Other embodiments may utilize fewer vectors (e.g., skill, school, and title), or additional vectors, or different combinations of vectors. The embodiments illustrated in FIG. 8 should therefore not be interpreted to be exclusive or limiting, but rather illustrative.

Figure 9:
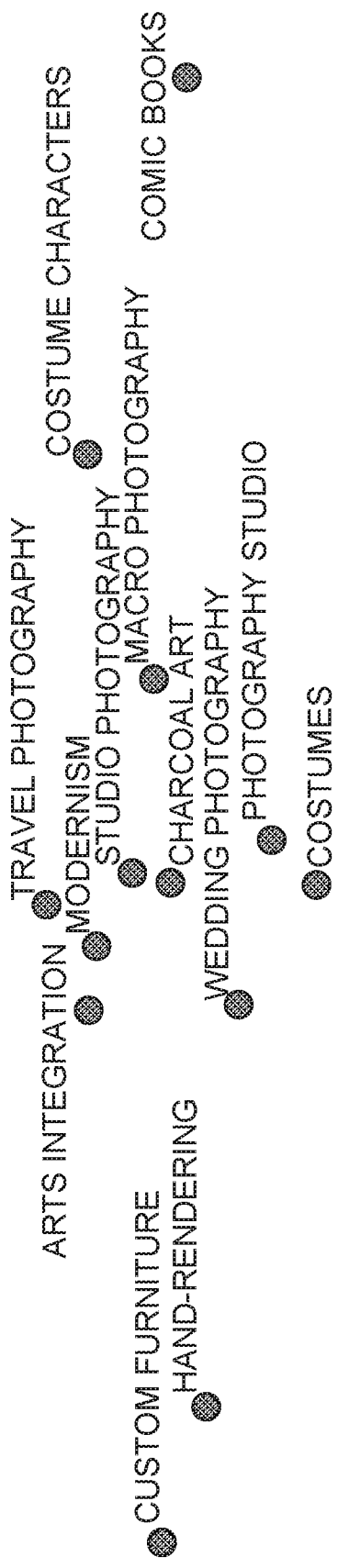
FIG. 9 is a visualization of skill-similarity vectors, according to some example embodiments.

FIG. 9 is a visualization of skill-similarity vectors, according to some example embodiments. Dimensionality reduction may be used to visualize multidimensional vectors, such as t-Distributed Stochastic Neighbor Embedding (t-SNE). FIG. 9 illustrates the position of a subset of vectors for available skills. The skills are related, such as travel photography, arts integration, custom furniture, etc. It can be observed that a cluster of skills in the center are more related than other skills situated towards the outside. For example, modernism, studio photography, macro photography, charcoal art, wedding photography, are similar skills placed in proximity. Other skills, such as costume characters, hand-rendering, or comic books are further away, and, although related to the other skills, are less related than the skills clustered in the center.

Figure 10:
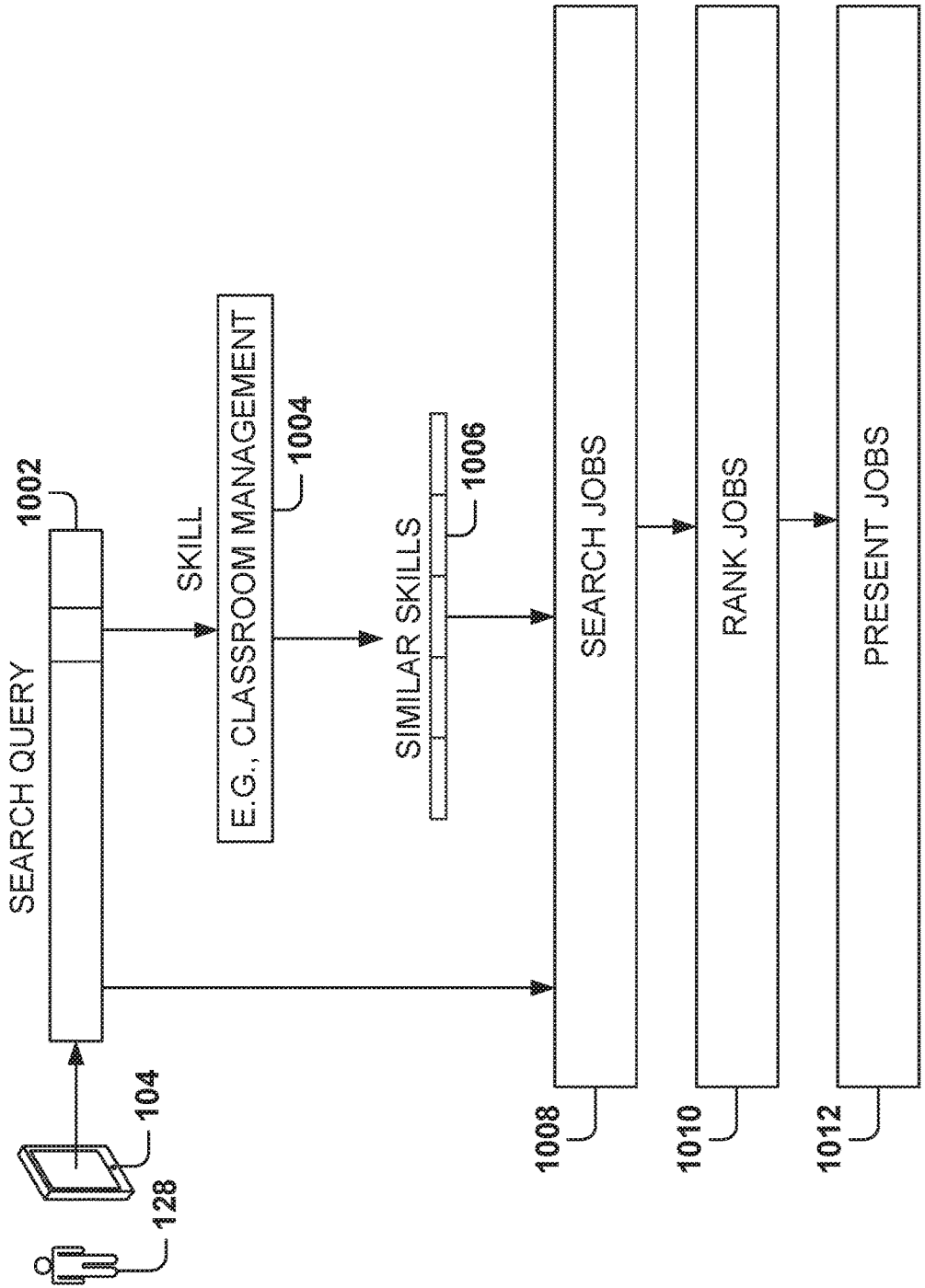
FIG. 10 illustrates a method for expanding a job search query with similar user skills, according to some example embodiments.

FIG. 10 illustrates a method for expanding a job search query with similar user skills, according to some example embodiments. A user 128 enters, in a client device, such as the client device 104, the search query 1002 for searching jobs. The job search query 1002 may include a skill 1004 (e.g., classroom management), which is identified by a tagger in the search query 1002. For example, if the skill 1004 "classroom management" is identified, similar skills 1006 are obtained and used for the job search 1008. In one example embodiment, for the skill 1004 "classroom management," the following similar skills 1006 are included for the job search 1008: "lesson planning," "curriculum development," "teacher training," "differentiated instruction," and "literacy."

In some example embodiments, a threshold similarity coefficient is identified and the skills with a similarity coefficient above the threshold are included in the job search 1008. After the jobs are searched, the jobs are ranked 1010 and presented 1012 to the user.

In some example embodiments, skills may also be extracted from job posts, even if the job posts do not specifically define a desired skill. For example, by analyzing the job title, description, or requirements, one or more skills may be identified for the job. The goal is to recommend jobs to users who have skills relevant to the job, including skills that are similar to the ones found in the job posting. If only the literal meaning is considered for the job skills, then important opportunities may be lost. For example, if the job search system is not aware of the similarity between "classroom management" and "literacy" skills, then a user may miss jobs that are good matches for the user.

Figure 11:
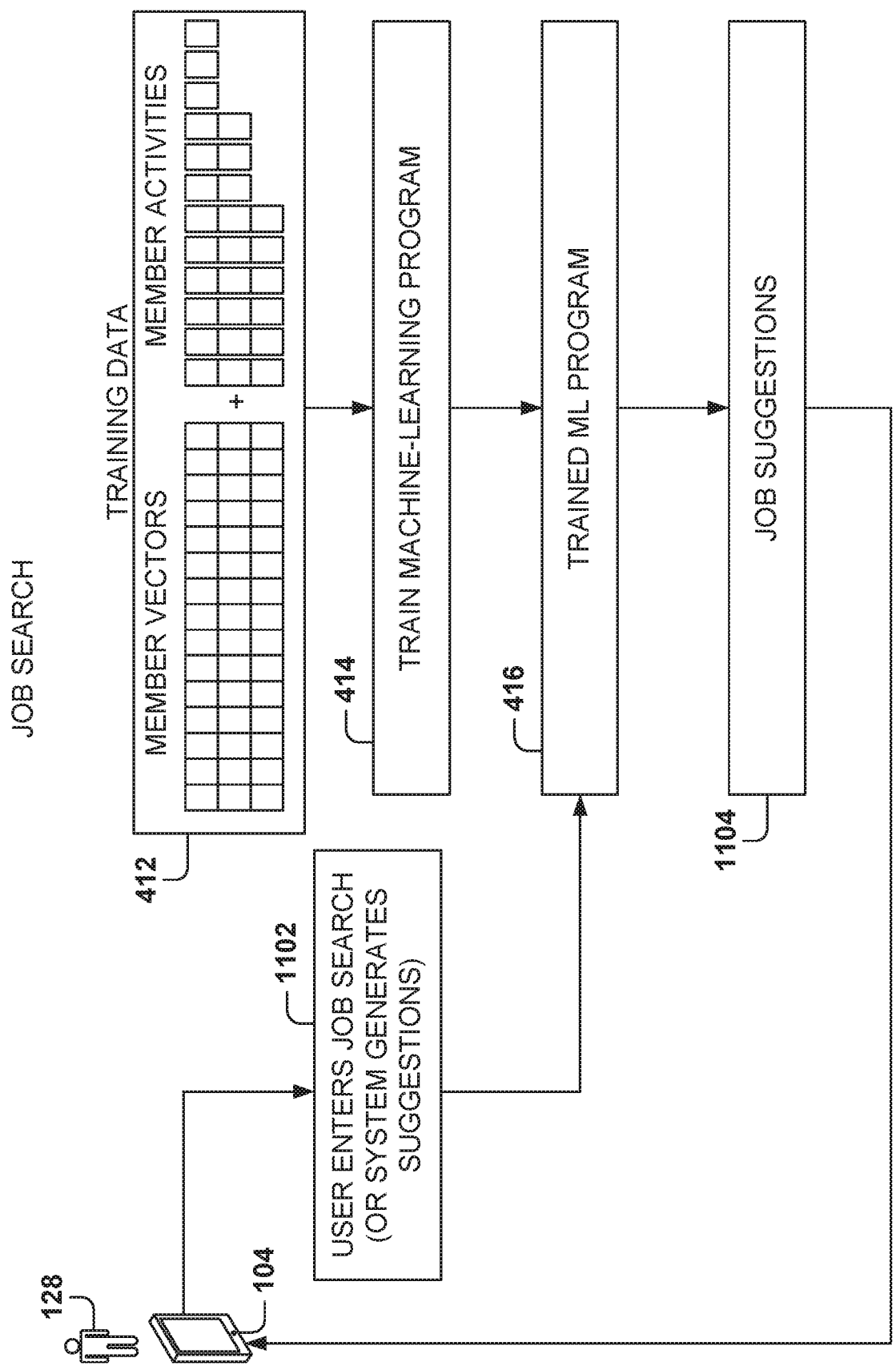
FIG. 11 illustrates a job search utilizing similarity vectors, according to some example embodiments.

FIG. 11 illustrates a job search utilizing similarity vectors, according to some example embodiments. A MLP is trained (operation 414) with training data 412, which includes the user vectors capturing categorical data for the users (e.g., user vector 820 in FIG. 8) and user activity data (e.g., searches performed, jobs selected for view), job data, and other (see features 402 in FIG. 4). The result of the training is a trained MLP 416 for searching jobs based on the values of the identified features.

When the user 128 enters a job search (in an operation 1102) (or when the system initiates a job search to offer job suggestions), the job search is input into the trained MLP 416. The MLP 416 then generates jobs suggestions (operation 1104) based on the user and job characteristics.

If there is a new user to the social network with little or no activity data, the system is able to identify jobs based on the activities of users of the social network with a similar profile (e.g., similar user vector) to the new user. Further, if a new job is added to the system, the system is able to identify users well suited for that job based on the user characteristics and user activities with reference to similar jobs.

Figure 12:
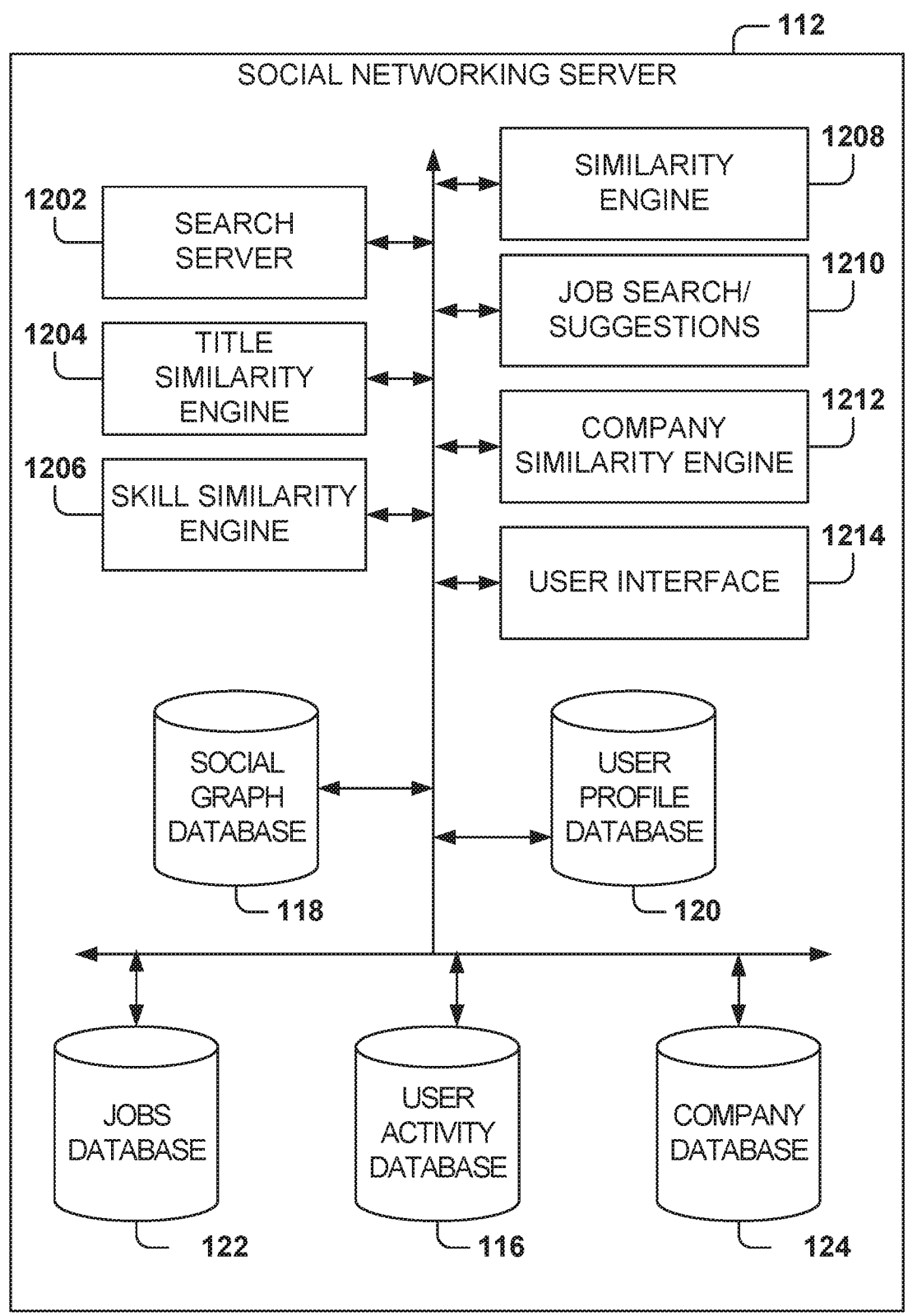
FIG. 12 illustrates a social networking server for implementing example embodiments.

FIG. 12 illustrates a social networking server for implementing example embodiments. In one example embodiment, the social networking server 112 includes a search server 1202, a title similarity engine 1204, a skill similarity engine 1206, a similarity engine 1208, a job search/suggestions server 1210, a company similarity engine 1212, a user interface 1214, and a plurality of databases, which include the social graph database 118, the user profile database 120, the jobs database 122, the user activity database 116, and the company database 124.

The similarity engine calculates the graphs and the similarities based on the calculated graphs. The search server 1202 performs data searches on the social network, such as searches for users or companies. The job search/suggestions server 1210 performs job searches based on a search query or based on a user profile in order to offer job suggestions. In some example embodiments, the search server 1202 includes a machine-learning algorithm for performing the searches, which utilizes a plurality of features for selecting and scoring the jobs. The features include, at least, one or more of title, industry, skills, user profile, company profile, job title, job data, region, and salary range.

The title similarity engine 1204 analyzes data in order to find similarities among the different titles by calculating the title vectors based on the title graphs.

The skill similarity engine 1206 analyzes data in order to find similarities among the different skills by calculating the skill vectors based on the skill graphs. For example, the skill similarity engine 1206 performs the operations illustrated in FIGS. 5-8.

The company similarity engine 1212 analyzes data in order to find similarities among the different companies by calculating the company vectors based on the company graphs.

The user interface 1214 communicates with the client devices 128 to exchange user interface data for presenting the user interface 1214 to the user. It is noted that the embodiments illustrated in FIG. 12 are examples and do not describe every possible embodiment. Other embodiments may utilize different servers, additional servers, combine the functionality of two or more servers into a single server, utilize a distributed server pool, and so forth. The embodiments illustrated in FIG. 12 should therefore not be interpreted to be exclusive or limiting, but rather illustrative.

Figure 13:
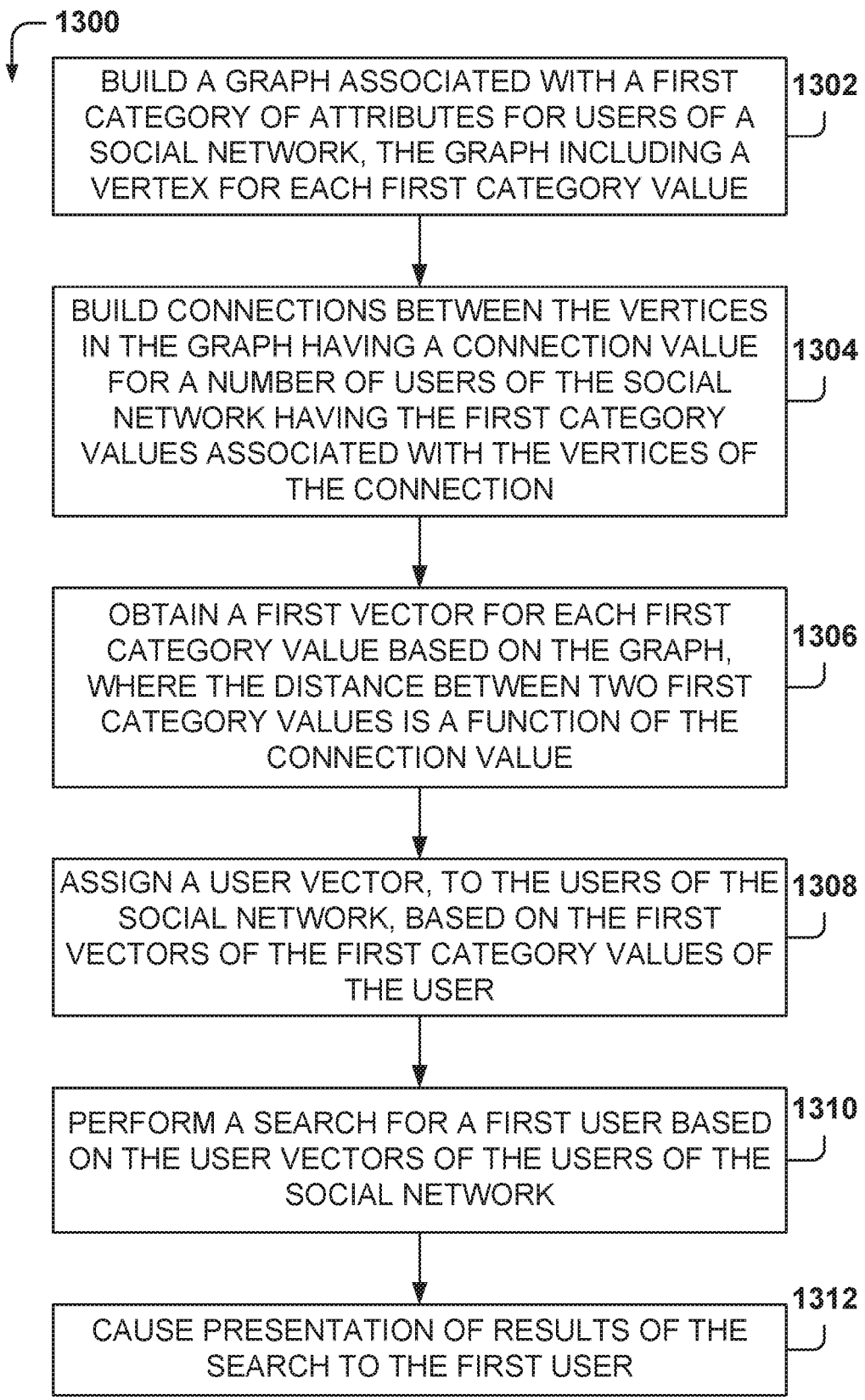
FIG. 13 is a flowchart of a method for embedding user categories into vectors that capture the similarities between the user categories, according to some example embodiments.

FIG. 13 is a flowchart of a method 1300 for embedding user categories into vectors that capture the similarities between the user categories, according to some example embodiments. While the various operations in this flowchart are presented and described sequentially, one of ordinary skill will appreciate that some or all of the operations may be executed in a different order, be combined or omitted, or be executed in parallel.

At operation 1302, one or more processors build a graph associated with a first category of attributes for users of a social network, the graph including a vertex for each first category value. From operation 1302, the method 1300 flows to operation 1304 for building, by the one or more processors, connections between the vertices in the graph. Each connection has a connection value indicating a number of users of the social network having assigned the first category values associated with the vertices of the connection.

From operation 1304, the method 1300 flows to operation 1306 for obtaining, by the one or more processors, a first vector for each first category value based on the graph, where a distance between two first category values is a function of the connection value between the corresponding vertices.

From operation 1306, the method 1300 flows to operation 1308 for assigning, by the one or more processors, a user vector to the users of the social network, the user vector for each user being based on the first vectors of the first category values assigned to the user.

At operation 1310, the one or more processors perform a search for a first user based on the user vectors of the users of the social network, and at operation 1312, the one or more processors cause presentation of results of the search to the first user.

In one example, assigning the user vector to a user further includes: identifying the first category values of the user; when the user has one first category value, making the user vector equal to the first vector associated with the first category value; and when the user has more than one first category values, combining the first vectors associated with the first category values of the user to obtain the user vector.

In one example, combining the first vector further includes calculating an elementwise maximum of the components of each vector to obtain the user vector.

In one example, performing the search further comprises receiving search data, utilizing a machine-learning program (MLP) to assign a score to a plurality of possible search results based on the search data, the MLP being trained with profile data from the users of the social network, user vectors, and activity data of the users of the social network, and sorting the possible search results based on their respective scores.

In one example, the first category is skills of a user of the social network, where the search is for jobs, and where the MLP assigns a score to each of a plurality of jobs based on the skills of the user and characteristics of the jobs.

In one example, the method 1300 further comprises obtaining a second vector for each second category value for a second category based on a second graph built for the second category, and assigning a second category user vector to each user based on the second vectors, where performing the search is further based on the second category user vector.

In one example, the user vector and the second category user vector are concatenated for training the MLP.

In one example, the first category is selected from a group consisting of skills of the user, companies of the user, educational institutions of the user, and title of the user.

In one example, obtaining the first vector further comprises using first-order proximity to minimize vector distance between two first category values based on the connection value of the two first category values.

In one example, obtaining the first vector further comprises using second-order proximity to minimize vector distance between two first category values based on a number of shared connections in the graph.

Figure 14:
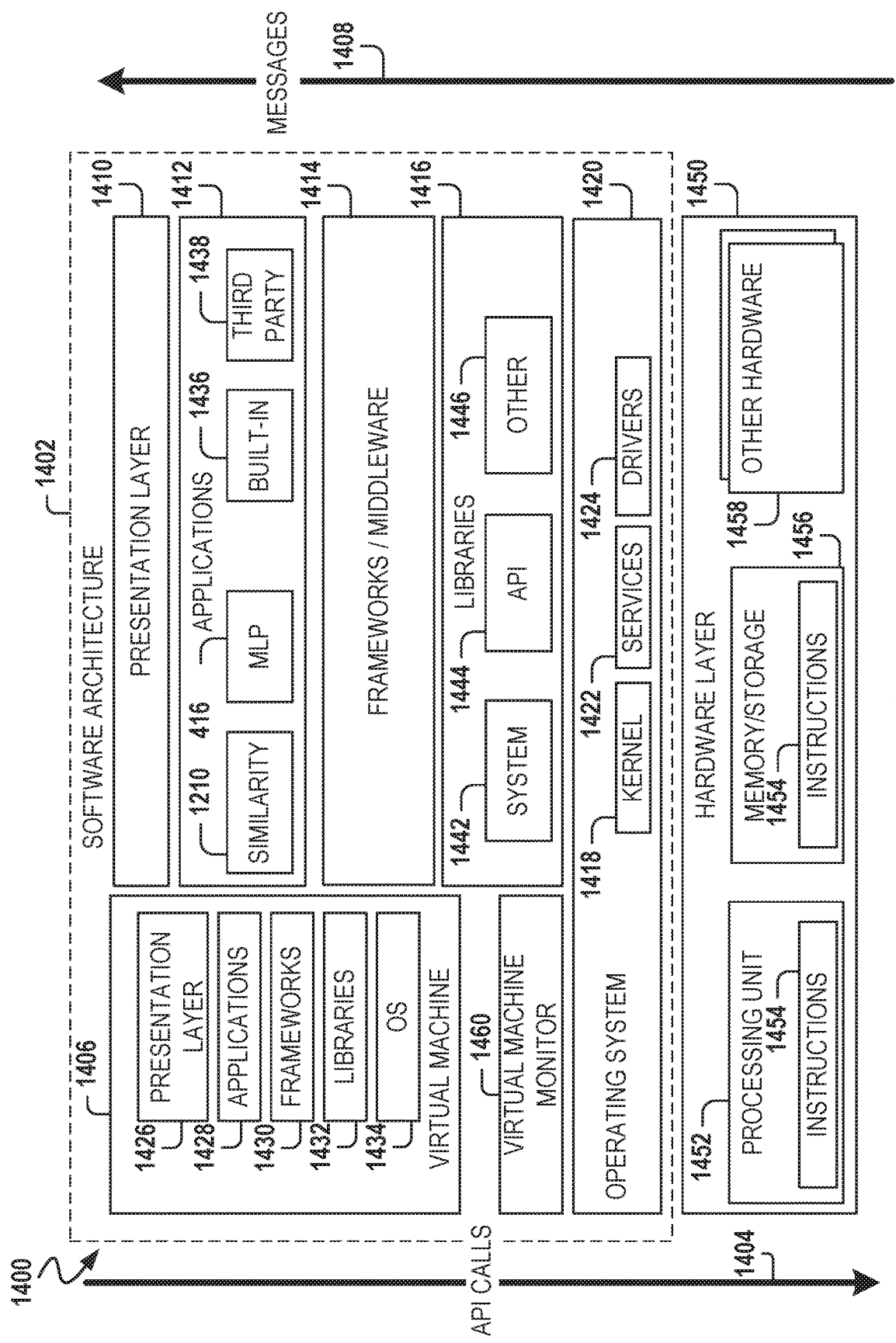
FIG. 14 is a block diagram illustrating an example of a software architecture that may be installed on a machine, according to some example embodiments.

FIG. 14 is a block diagram illustrating an example of a software architecture that may be installed on a machine, according to some example embodiments. FIG. 14 is merely a non-limiting example of a software architecture 1402 and it will be appreciated that many other architectures may be implemented to facilitate the functionality described herein. The software architecture 1402 may be executing on hardware such as a machine 1500 of FIG. 15 that includes, among other things, processors 1504, memory/storage 1506, and input/output (I/O) components 1518. A representative hardware layer 1450 is illustrated and may represent, for example, the machine 1500 of FIG. 15. The representative hardware layer 1450 comprises one or more processing units 1452 having associated executable instructions 1454. The executable instructions 1454 represent the executable instructions of the software architecture 1402, including implementation of the methods, modules and so forth of FIGS. 1-13. The hardware layer 1450 also includes memory and/or storage modules 1456, which also have the executable instructions 1454. The hardware layer 1450 may also comprise other hardware 1458, which represents any other hardware of the hardware layer 1450, such as the other hardware illustrated as part of the machine 1500.

In the example architecture of FIG. 14, the software architecture 1402 may be conceptualized as a stack of layers where each layer provides particular functionality. For example, the software architecture 1402 may include layers such as an operating system 1420, libraries 1416, frameworks/middleware 1414, applications 1412, and a presentation layer 1410. Operationally, the applications 1412 and/or other components within the layers may invoke application programming interface (API) calls 1404 through the software stack and receive a response, returned values, and so forth illustrated as messages 1408 in response to the API calls 1404. The layers illustrated are representative in nature and not all software architectures have all layers. For example, some mobile or special purpose operating systems may not provide a frameworks/middleware layer 1414, while others may provide such a layer. Other software architectures may include additional or different layers.

The operating system 1420 may manage hardware resources and provide common services. The operating system 1420 may include, for example, a kernel 1418, services 1422, and drivers 1424. The kernel 1418 may act as an abstraction layer between the hardware and the other software layers. For example, the kernel 1418 may be responsible for memory management, processor management (e.g., scheduling), component management, networking, security settings, and so on. The services 1422 may provide other common services for the other software layers. The drivers 1424 may be responsible for controlling or interfacing with the underlying hardware. For instance, the drivers 1424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1412 and/or other components and/or layers. The libraries 1416 typically provide functionality that allows other software modules to perform tasks in an easier fashion than to interface directly with the underlying operating system 1420 functionality (e.g., kernel 1418, services 1422, and/or drivers 1424). The libraries 1416 may include system libraries 1442 (e.g., C standard library) that may provide functions such as memory allocation functions, string manipulation functions, mathematic functions, and the like. In addition, the libraries 1416 may include API libraries 1444 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1416 may also include a wide variety of other libraries 1446 to provide many other APIs to the applications 1412 and other software components/modules.

The frameworks 1414 (also sometimes referred to as middleware) may provide a higher-level common infrastructure that may be utilized by the applications 1412 and/or other software components/modules. For example, the frameworks 1414 may provide various graphic user interface (GUI) functions, high-level resource management, high-level location services, and so forth. The frameworks 1414 may provide a broad spectrum of other APIs that may be utilized by the applications 1412 and/or other software components/modules, some of which may be specific to a particular operating system or platform.

The applications 1412 include similarity applications 1208, MLP 416, built-in applications 1436, and third-party applications 1438. Examples of representative built-in applications 1436 may include, but are not limited to, a contacts application, a browser application, a book reader application, a location application, a media application, a messaging application, and/or a game application. The third-party applications 1438 may include any of the built-in applications 1436 as well as a broad assortment of other applications. In a specific example, the third-party application 1438 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1438 may invoke the API calls 1404 provided by the mobile operating system such as the operating system 1420 to facilitate functionality described herein.

The applications 1412 may utilize built-in operating system functions (e.g., kernel 1418, services 1422, and/or drivers 1424), libraries (e.g., system libraries 1442, API libraries 1444, and other libraries 1446), or frameworks/middleware 1414 to create user interfaces to interact with users of the system. Alternatively, or additionally, in some systems, interactions with a user may occur through a presentation layer, such as the presentation layer 1410. In these systems, the application/module "logic" may be separated from the aspects of the application/module that interact with a user.

Some software architectures utilize virtual machines. In the example of FIG. 14, this is illustrated by a virtual machine 1406. A virtual machine creates a software environment where applications/modules may execute as if they were executing on a hardware machine (such as the machine 1500 of FIG. 15, for example). The virtual machine 1406 is hosted by a host operating system (e.g., operating system 1420 in FIG. 14) and typically, although not always, has a virtual machine monitor 1460, which manages the operation of the virtual machine 1406 as well as the interface with the host operating system (e.g., operating system 1420). A software architecture executes within the virtual machine 1406 such as an operating system 1434, libraries 1432, frameworks/middleware 1430, applications 1428, and/or a presentation layer 1426. These layers of software architecture executing within the virtual machine 1406 may be the same as corresponding layers previously described or may be different.

Figure 15:
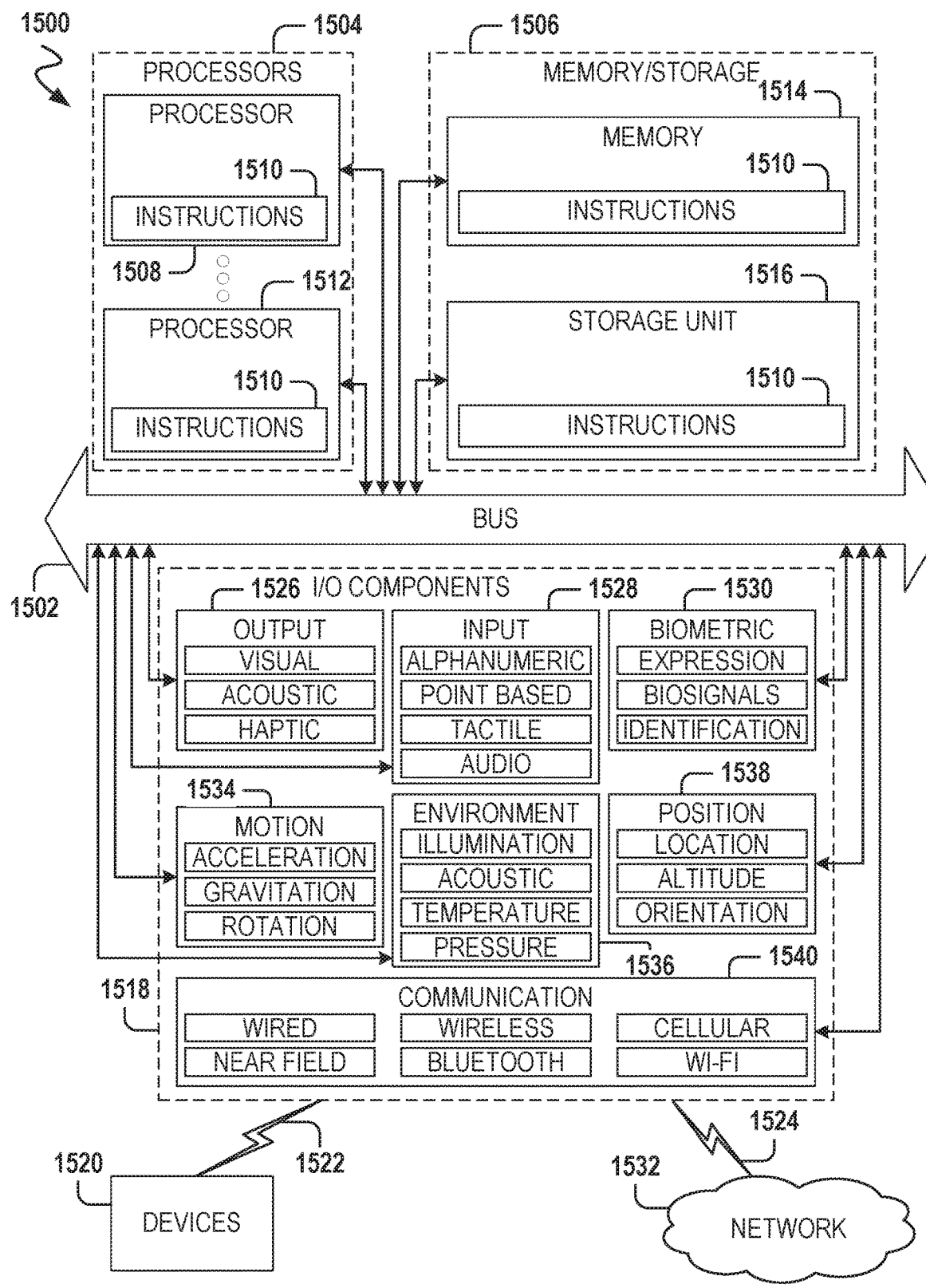
FIG. 15 illustrates a diagrammatic representation of a machine in the form of a computer system within which a set of instructions may be executed for causing the machine to perform any one or more of the methodologies discussed herein, according to an example embodiment.

FIG. 15 illustrates a diagrammatic representation of a machine in the form of a computer system within which a set of instructions may be executed for causing the machine to perform any one or more of the methodologies discussed herein, according to an example embodiment. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute the flow diagrams of FIGS. 4, 6, 8 and 10-11. Additionally, or alternatively, the instructions 1510 may implement the programs of social networking server 112, including the search server 1202, the title similarity engine 1204, the skill similarity engine 1206, the similarity engine 1208, the job search/suggestions 1210, the company similarity engine 1212, and the user interface 1214 of FIG. 12, and so forth. The instructions 1510 transform the general, non-programmed machine 1500 into a particular machine 1500 programmed to carry out the described and illustrated functions in the manner described.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines 1500 that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1508 and a processor 1512 that may execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single core, a single processor with multiple cores (e.g., a multi-core processor), multiple processors with a single core, multiple processors with multiples cores, or any combination thereof.

The memory/storage 1506 may include a memory 1514, such as a main memory or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of the processors 1504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1510. The term "machine-readable medium" shall also be taken to include any medium, or combination of multiple media, that is capable of storing instructions (e.g., instructions 1510) for execution by a machine (e.g., machine 1500), such that the instructions, when executed by one or more processors of the machine (e.g., processors 1504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1518 may include a wide variety of components to receive input, provide output, produce output, transmit information, exchange information, capture measurements, and so on. The specific I/O components 1518 that are included in a particular machine will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion, and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

In various example embodiments, one or more portions of the network 1532 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1532 or a portion of the network 1532 may include a wireless or cellular network and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1510 may be transmitted or received over the network 1532 using a transmission medium via a network interface device (e.g., a network interface component included in the communication components 1540) and utilizing any one of a number of well-known transfer protocols (e.g., hypertext transfer protocol (HTTP)). Similarly, the instructions 1510 may be transmitted or received using a transmission medium via the coupling 1522 (e.g., a peer-to-peer coupling) to the devices 1520. The term "transmission medium" shall be taken to include any intangible medium that is capable of storing, encoding, or carrying the instructions 1510 for execution by the machine 1500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    building, by one or more processors, a graph associated with a first categorical attribute of members of a network service, each first categorical attribute of a member having one or more first category values from a finite set of predefined possible category values, the graph including a vertex for each first category value;
    building, by the one or more processors, connections between pairs of vertices in the graph, each connection between two vertices in a pair of vertices having a connection value indicating a number of members of the network service having the first category values associated with the vertices of the connection as indicated in a member profile;
    deriving, by the one or more processors, a first vector for each first category value based on the graph, wherein a distance between vectors associated with two first category values is a function of the connection value between the corresponding vertices indicating the number of members of the connection;
    assigning, by the one or more processors, a member vector to each member of a plurality of members of the network service, the member vector for each member derived by:
        identifying the first category values associated with the member, as indicated in a member profile of the member;
        when the member is associated with one first category value, making the member vector equal to the first vector associated with the first category value; and
        when the member is associated with more than one first category value, combining the first vectors associated with the first category values of the member to obtain the member vector;
    performing, for a first member, a search of items in a database to obtain search data;
    utilizing a machine learning model to assign a score to each search result in a plurality of search results based on the search data, the machine learning model being trained with profile data from members of the network service, member vectors, and activity data of the members of the network service, wherein the score assigned to each search result by the machine learning model is based in part on a distance between a member vector of the first member and a vector representative of the search result; and
    causing, by the one or more processors, presentation of the search results of the search of items to the first member.

2. The method as recited in claim 1, wherein combining the first vectors further comprises:
    calculating an elementwise maximum of the components of each vector to obtain the member vector.

3. The method as recited in claim 2, wherein the first categorical attribute is skills of a member of the network service, wherein the search is a search for job listings, wherein the machine learning model assigns a score to each of a plurality of job listings based on the skills of the member, skills that are similar to the skills of the member, and skills associated with the job listing.

4. The method as recited in claim 1, further comprising:
    obtaining a second vector for each second category value for a second categorical attribute based on a second graph built for the second categorical attribute; and
    assigning a second category member vector to each member based on the second vectors, wherein performing the search is further based on the second category member vector.

5. The method as recited in claim 4, wherein the member vector and the second category member vector are concatenated for training the machine learning model.

6. The method as recited in claim 1, wherein the first categorical attribute is selected from a group consisting of skills of the member, companies of the member, educational institutions of the member, and titles of the member.

7. The method as recited in claim 1, wherein obtaining the first vector further comprises:
using first-order proximity to minimize vector distance between two first category values based on the connection value of the two first category values.

8. The method as recited in claim 1, wherein obtaining the first vector further comprises:
using second-order proximity to minimize vector distance between two first category values based on a number of shared connections in the graph.

9. A system comprising:
a memory comprising instructions; and
one or more computer processors, wherein the instructions, when executed by the one or more computer processors, cause the one or more computer processors to perform operations comprising:
building a graph associated with a first categorical attribute of members of a network service, each first categorical attribute of a member having one or more first category values from a finite set of predefined possible category values, the graph including a vertex for each first category value;
building connections between pairs of vertices in the graph, each connection between two vertices in a pair of vertices having a connection value indicating a number of members of the network service having the first category values associated with the vertices of the connection as indicated in a member profile;
deriving a first vector for each first category value based on the graph, wherein a distance between vectors associated with two first category values is a function of the connection value between the corresponding vertices indicating the number of members of the connection;
assigning a member vector to each member of a plurality of members of the network service, the member vector for each member derived by:
identifying the first category values associated with the member, as indicated in a member profile of the member;
when the member is associated with one first category value, making the member vector equal to the first vector associated with the first category value; and
when the member is associated with more than one first category value, combining the first vectors associated with the first category values of the member to obtain the member vector;
performing, for a first member, a search of items in a database to obtain search data;
utilizing a machine learning model to assign a score to each search result in a plurality of search results based on the search data, the machine learning model being trained with profile data from members of the network service, member vectors, and activity data of the members of the network service, wherein the score assigned to each search result by the machine learning model is based in part on a distance between a member vector of the first member and a vector representative of the search result; and
causing presentation of the search results of the search of items to the first member.

10. The system as recited in claim 9, wherein combining the first vectors further comprises:
calculating an elementwise maximum of the components of each vector to obtain the member vector.

11. The system as recited in claim 9, wherein the first categorical attribute is skills of a member of the network service, wherein the search is a search for job listings, wherein the machine learning model assigns a score to each of a plurality of job listings based on the skills of the member, skills that are similar to the skills of the member, and skills associated with the job listings.

12. A non-transitory machine-readable storage medium including instructions that, when executed by a machine, cause the machine to perform operations comprising:
building a graph associated with a first categorical attribute of members of a network service, each first categorical attribute of a member having one or more first category values from a finite set of predefined possible category values, the graph including a vertex for each first category value;
building connections between pairs of vertices in the graph, each connection between two vertices in a pair of vertices having a connection value indicating a number of members of the network service having the first category values associated with the vertices of the connection as indicated in a member profile;
deriving a first vector for each first category value based on the graph, wherein a distance between vectors associated with two first category values is a function of the connection value between the corresponding vertices indicating the number of members of the connection;
assigning a member vector to each member of a plurality of members of the network service, the member vector for each member derived by:
identifying the first category values associated with the member, as indicated in a member profile of the member;
when the member is associated with one first category value, making the member vector equal to the first vector associated with the first category value; and
when the member is associated with more than one first category value, combining the first vectors associated with the first category values of the member to obtain the member vector;
performing, for a first member, a search of items in a database to obtain search results;
utilizing a machine learning model to assign a score to each search result in a plurality of search results based on the search data, the machine learning model being trained with profile data from members of the network service, member vectors, and activity data of the members of the network service, wherein the score assigned to each search result by the machine learning model is based in part on a distance between a member vector of the first member and a vector representative of the search result; and
causing presentation of the search results of the search of items to the first member.

13. The machine-readable storage medium as recited in claim 12, wherein combining the first vectors further comprises:
calculating an elementwise maximum of the components of each vector to obtain the member vector.

14. The machine-readable storage medium as recited in claim 12, wherein the first categorical attribute is skills of a member of the network service, wherein the search is for job listings, wherein the machine learning model assigns a score to each of a plurality of job listings based on the skills of the member, skills that are similar to the skills of the member, and skills associated with the job listings.

* * * * *